(12) United States Patent
Hsu

(10) Patent No.: US 6,302,806 B1
(45) Date of Patent: Oct. 16, 2001

(54) SHAFT OF GOLF CLUB

(76) Inventor: Patrick C. T. Hsu, No. 132, Chung Yi Street, Taichung City (TW)

( * ) Notice: Subject to any disclaimer, the term of this patent is extended or adjusted under 35 U.S.C. 154(b) by 0 days.

(21) Appl. No.: 09/258,905

(22) Filed: Mar. 1, 1999

(30) Foreign Application Priority Data

Feb. 9, 1999 (TW) .................................................. 88202179

(51) Int. Cl.⁷ ............................. A63B 53/10; A63B 53/12
(52) U.S. Cl. ............................................ 473/320; 473/321
(58) Field of Search ...................................... 473/319–321

(56) References Cited

U.S. PATENT DOCUMENTS

| | | | |
|---|---|---|---|
| 5,049,422 | * | 9/1991 | Honma . |
| 5,242,720 | * | 9/1993 | Blake . |
| 5,265,872 | * | 11/1993 | Tennent et al. . |
| 5,421,574 | * | 6/1995 | Yamagishi . |
| 5,427,373 | * | 6/1995 | Kusumoto . |
| 5,437,450 | * | 8/1995 | Akatsuka . |
| 5,512,119 | * | 4/1996 | Takezawa . |
| 5,620,380 | * | 4/1997 | Tennent ................................. 473/319 |
| 5,947,839 | * | 9/1999 | Kusumoto . |
| 6,063,839 | * | 5/2000 | Oosedo . |

* cited by examiner

Primary Examiner—Sebastiano Passaniti
Assistant Examiner—Stephen L. Blau
(74) Attorney, Agent, or Firm—Browdy and Neimark

(57) ABSTRACT

A golf club shaft is provided with a weighted segment located at the tip end thereof for lowering the position of center of gravity of the golf club shaft, a reinforced segment located near the butt end thereof, and a flexing segment located between the weighted segment and the reinforced segment for confining the position of the flexing point of the golf club shaft.

6 Claims, 2 Drawing Sheets

SHAFT OF GOLF CLUB

FIELD OF THE INVENTION

The present invention relates generally to a golf club, and more particularly to an improvement on the shaft of the golf club.

BACKGROUND OF THE INVENTION

The conventional golf club shaft is generally made of a carbon fiber material impregnated with epoxy resin and is tapered gradually from its butt end toward its tip end. In the process of making a golf club, a shaft is made in accordance with specifications. Thereafter, portions of the tip end and the butt end of the shaft are cut off so as to fasten respectively a head with the tip end, and a grip with the butt end, thereby resulting in a change in the flexing point of the shaft as well as difficulty in adjusting the position of center of gravity of the shaft.

SUMMARY OF THE INVENTION

It is therefore the primary objective of the present invention to provide a golf club shaft which can be effectively adjusted in the position of its center of gravity.

It is another objective of the present invention to provide a golf club shaft with a flexing point which is not susceptible to a change.

In keeping with the principle of the present invention, the foregoing objectives of the present invention are attained by a golf club shaft which is provided with a weighted segment located at the tip end thereof for lowering the position of center of gravity of the golf club shaft, a reinforced segment located near the butt end thereof, and a flexing segment located between the weighted segment and the reinforced segment for confining the position of the flexing point of the golf club shaft.

The foregoing objectives, features, functions, and advantages of the present invention will be more readily understood upon a thoughtful deliberation of the following detailed description of the preferred embodiments of the present invention with reference to the accompanying drawings.

DETAILED DESCRIPTION OF THE INVENTION

Figure 1:
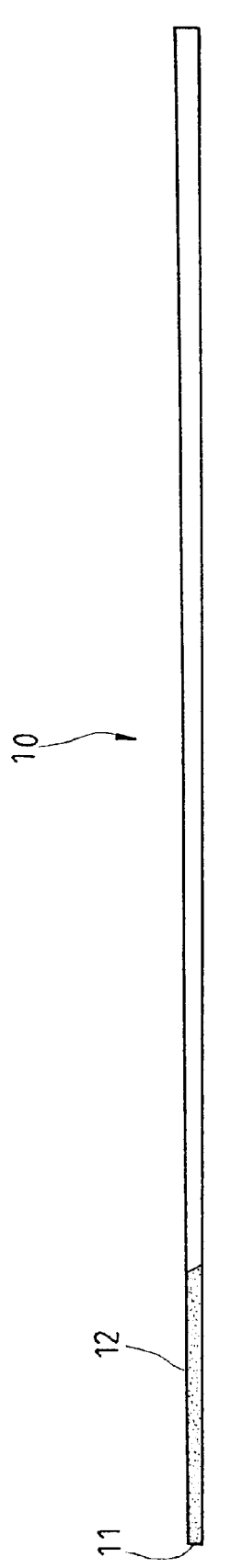
FIG. 1 shows a front view of a first preferred embodiment of the present invention.

As shown in FIG. 1, a golf club shaft 10 of the first preferred embodiment of the present invention is made of a carbon fiber material impregnated with epoxy resin. The shaft 10 has a tip end 11 which is provided with a weighted segment 12 formed of metal filaments on the outermost layer of the tip end 11. The weighted segment 12 is intended to lower the position of center of gravity of the golf club shaft 10. The metal filaments are made of a copper or stainless steel material and is greater in specific gravity than the carbon fiber. For this reason, the weighted segment 12 can effectively lower the position of center of gravity of the golf club shaft 10.

Figure 2:
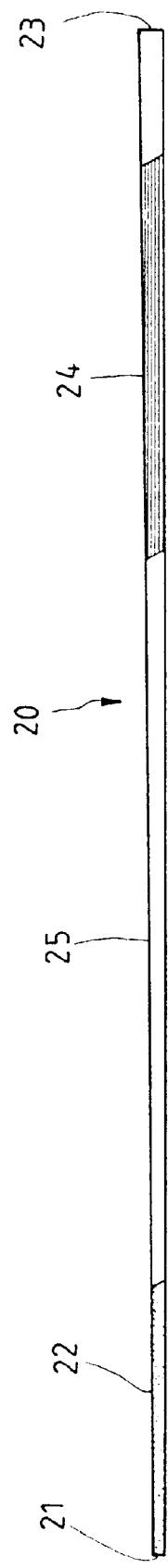
FIG. 2 shows a front view of a second preferred embodiment of the present invention.

As shown in FIG. 2, a golf club shaft 20 of the second preferred embodiment of the present invention is provided with a weighted segment 22 located at the tip end 21 thereof, a reinforced segment 24 which is formed of metal filaments and located near the butt end 23 of the shaft 20, and a flexing segment 25 located between the weighted segment 22 and the reinforced segment. The reinforced segment 24 consists of a plurality of stainless steel filaments which are arranged at an interval along the direction of the longitudinal axis of the shaft 20. The stainless steel filaments are arranged at an interval so as to avoid adding too much weight to the shaft 20. The stainless steel filaments are parallel to the longitudinal axis of the shaft 20.

Figure 3:
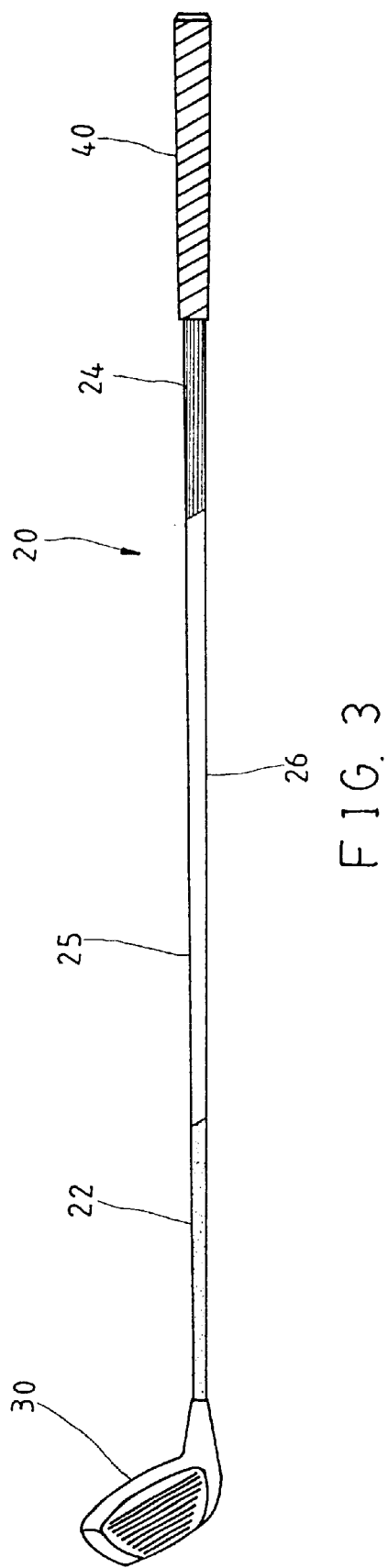
FIG. 3 shows a front view of a golf club formed of a shaft of the second preferred embodiment of the present invention.

Now referring to FIG. 3, a golf club is composed of the shaft 20 of the second preferred embodiment of the present invention, a head 30, and a grip 40. Both tip end and butt end of the shaft 20 are partially cut off before the head 30 and the grip 40 are fastened therewith respectively. The golf club is thus provided with a relatively low center of gravity, thanks to the weighted segment 22. In addition, the deformation of the shaft 20 is concentrated on the flexing segment 25 at the time when the golf club is swung to hit a ball, due to the fact that the weighted segment 22 and the reinforced segment 24 are less vulnerable to deformation. The flexing segment 25 has a flexing point 26 which is always located at the midpoint of the flexing segment 25 regardless of the cut-off length of the tip end or the butt end of the shaft 20. In other words, the weighted segment 22 and the reinforced segment 24 are regarded together as a rigid area, whereas the flexing segment 25 is regarded as a pliable area. Such a division of the shaft 20 as described above is highly beneficial to design and production of the golf club.

What is claimed is:

1. A golf club made of a carbon fiber material impregnated with epoxy resin, said shaft having a tip end and a butt end,
    a weighted segment of metal filaments formed at the tip end, wherein said metal filaments of said weighted segment are made of copper, and
    a reinforced segment of metal filaments contiguous to the butt end,
    the metal filaments of the weighted segment and the reinforced segment being spaced apart on the shaft so as to produce a flexing segment without any metal filaments between the weighted segment and the reinforced segment.

2. The golf club shaft as defined in claim 1, wherein said weighted segment is formed of said metal filaments on the outermost layer of said tip end.

3. The golf club shaft as defined in claim 1, wherein said metal filaments of said weighted segment are arranged along the direction of a longitudinal axis of said shaft such that said metal filaments are parallel to the longitudinal axis of said shaft.

4. The golf club shaft as defined in claim 1, wherein the metal filaments of the reinforced segment are formed on the outermost layer of said shaft.

5. The golf club shaft as defined in claim 4, wherein said metal filaments of the reinforced segment are made of stainless steel and arranged along the direction of a longitudinal axis of said shaft such that said metal filaments are parallel to the longitudinal axis of said shaft.

6. The golf club shaft as defined in claim 5, wherein said metal filaments of the reinforced segment are arranged at an interval.

* * * * *